United States Patent
Yoshihara

[11] Patent Number: 6,095,305
[45] Date of Patent: Aug. 1, 2000

[54] ELECTROMAGNETIC COUPLING DEVICE WITH NOISE DAMPER

[75] Inventor: Hiroyasu Yoshihara, Kiryu, Japan

[73] Assignee: Ogura Clutch Co., Ltd., Madison Heights, Mich.

[21] Appl. No.: 09/130,532

[22] Filed: Aug. 4, 1998

[51] Int. Cl.[7] ................................................ F16D 19/00
[52] U.S. Cl. ................................ 192/84.961; 192/84.941
[58] Field of Search ........................... 192/84.96, 84.961, 192/84.941, 30 V, 200, FOR 100

[56] References Cited

U.S. PATENT DOCUMENTS

| | | | |
|---|---|---|---|
| 2,492,205 | 12/1949 | Warner | 192/84.96 X |
| 4,471,860 | 9/1984 | Yamada | 192/84.961 X |
| 4,808,870 | 2/1989 | Gonda | 192/84.961 |
| 5,009,297 | 4/1991 | Gonda | 192/84.941 |
| 5,046,594 | 9/1991 | Kakinuma | 192/84.961 |
| 5,184,705 | 2/1993 | Sekiguchi et al. | 192/84.941 |
| 5,361,883 | 11/1994 | Yamamoto | 192/84.961 |
| 5,445,256 | 8/1995 | Tabuchi et al. | 192/84.96 |
| 5,560,464 | 10/1996 | Gonda et al. | 192/84.96 |
| 5,575,370 | 11/1996 | Gonda et al. | 192/84.96 |
| 5,575,371 | 11/1996 | Gonda et al. | 192/84.96 |
| 5,601,168 | 2/1997 | Hayashi et al. | 192/84.96 X |
| 5,601,176 | 2/1997 | Ishimaru et al. | 192/84.96 X |
| 5,667,050 | 9/1997 | Hasegawa | 192/84.961 |
| 5,683,299 | 11/1997 | Kishibuchi et al. | 192/84.961 X |
| 5,692,591 | 12/1997 | Kimura | 192/84.941 |
| 5,751,202 | 5/1998 | Seino | 192/84.941 X |
| 5,931,274 | 8/1999 | Sakurai et al. | 192/84.961 |

FOREIGN PATENT DOCUMENTS

| | | | |
|---|---|---|---|
| 268790 | 5/1968 | Germany | 192/FOR 100 |
| 58-8997 | 2/1983 | Japan . | |
| 62-165031 | 7/1987 | Japan | 192/FOR 100 |
| 7-310763 | 11/1995 | Japan . | |
| 8-14276 | 1/1996 | Japan . | |
| 8-145076 | 6/1996 | Japan . | |
| 8-159172 | 6/1996 | Japan . | |
| 8-200400 | 8/1996 | Japan . | |
| 9-210095 | 8/1997 | Japan . | |
| 9-210096 | 8/1997 | Japan . | |
| 9-229094 | 9/1997 | Japan . | |
| 10-2353 | 1/1998 | Japan . | |
| 10-61678 | 3/1998 | Japan . | |
| 10-122264 | 5/1998 | Japan . | |

*Primary Examiner*—Charles A. Marmor
*Assistant Examiner*—Roger Pang
*Attorney, Agent, or Firm*—Bliss McGlynn P.C.

[57] ABSTRACT

An electromagnetic coupling device includes a damper rubber member to mitigate the sound generated during attraction of the armature to the rotor. The spring constant of the damper rubber member is increased by increasing the contact surface of the damper rubber member at a head portion of the torque transmission pin.

5 Claims, 3 Drawing Sheets

ELECTROMAGNETIC COUPLING DEVICE WITH NOISE DAMPER

BACKGROUND OF THE INVENTION

The present invention relates to a solenoid clutch which minimizes the noise generated by armature movement by damping the impact armature contacting the rotor.

Conventional solenoid clutches employ the following construction. An armature hub has apertures or holes in a flange portion. A damper cover having apertures communicating with the apertures of the armature is fixed to a flange portion of the armature hub. Each damper rubber piece has an aperture at the center that is accommodated in the damper cover. A collar has a flange portion which comes into contact with the outside surface of the damper rubber portion. The collar is fitted into the apertures of the damper rubber portion as well as the apertures of the flange portion of the damper rubber portion and the damper cover-armature hub. While the end face of the collar is brought into contact with the armature superposed with the flange portion of the armature hub, the armature and the collar are integrally fixed to one another by rivets (see Japanese Utility Model Publication No. 8997/1983). A torque transmission pin is formed by the collar and the rivets in the conventional solenoid clutch.

In the solenoid clutches having the construction described above, the armature is magnetically attracted to the rotor while compressing the damper rubber portion by the flange portion of the collar. The attraction force is caused by means of the magnetic flux which is generated when a current is supplied to a solenoid coil. When the supply of the current to the solenoid coil is removed, the magnetic flux collapses, so that the armature is separated from the rotor by the damper rubber.

In conventional solenoid clutches, noise is generated from the impact of the armature as it is attracted to the rotor. The present invention is directed to prevent the occurrence of the armature attraction sound by mitigating the impact.

SUMMARY OF THE INVENTION

A solenoid clutch according to a first embodiment of the present invention is characterized in that a spring constant of a damper rubber member is increased by increasing the contact area between the outside surface of the damper rubber portion and the inside surface of a head portion of a torque transmission pin. The contact occurs in the attraction process of an armature in which the armature is magnetically attracted to a rotor. The solenoid clutch having such a construction can obtain spring load characteristics having a variable spring constant of the damper rubber. The spring load of the damper rubber can be set to a high level for when the armature is magnetically attracted to the rotor. Consequently, the impact between the armature and the rotor can be mitigated and the occurrence of the noise generated or armature attraction sound can be minimized or reduced.

A solenoid clutch according to a second embodiment of the present invention forms the inside surface defined at the head portion of the torque transmission pin into a non-planar inside surface which is high near its center and low along its outer peripheral edge so as to increase the spring constant of the damper rubber in the attraction process of the armature. Therefore, the impact between the armature and the rotor can be similarly mitigated and the occurrence of the armature attraction sound can also be minimized or reduced.

A solenoid clutch according to a third embodiment of the present invention forms the outside surface of the damper rubber into a non-planar outside surface which is high near its center and is low around its outer peripheral edge so that the spring constant of the damper rubber is increased in the attraction process of the armature. Therefore, the third embodiment can similarly mitigate the impact between the armature and the rotor and can reduce the occurrence of the armature attraction sound.

DETAILED DESCRIPTION OF THE PRESENTLY PREFERRED EMBODIMENTS

Figure 1:
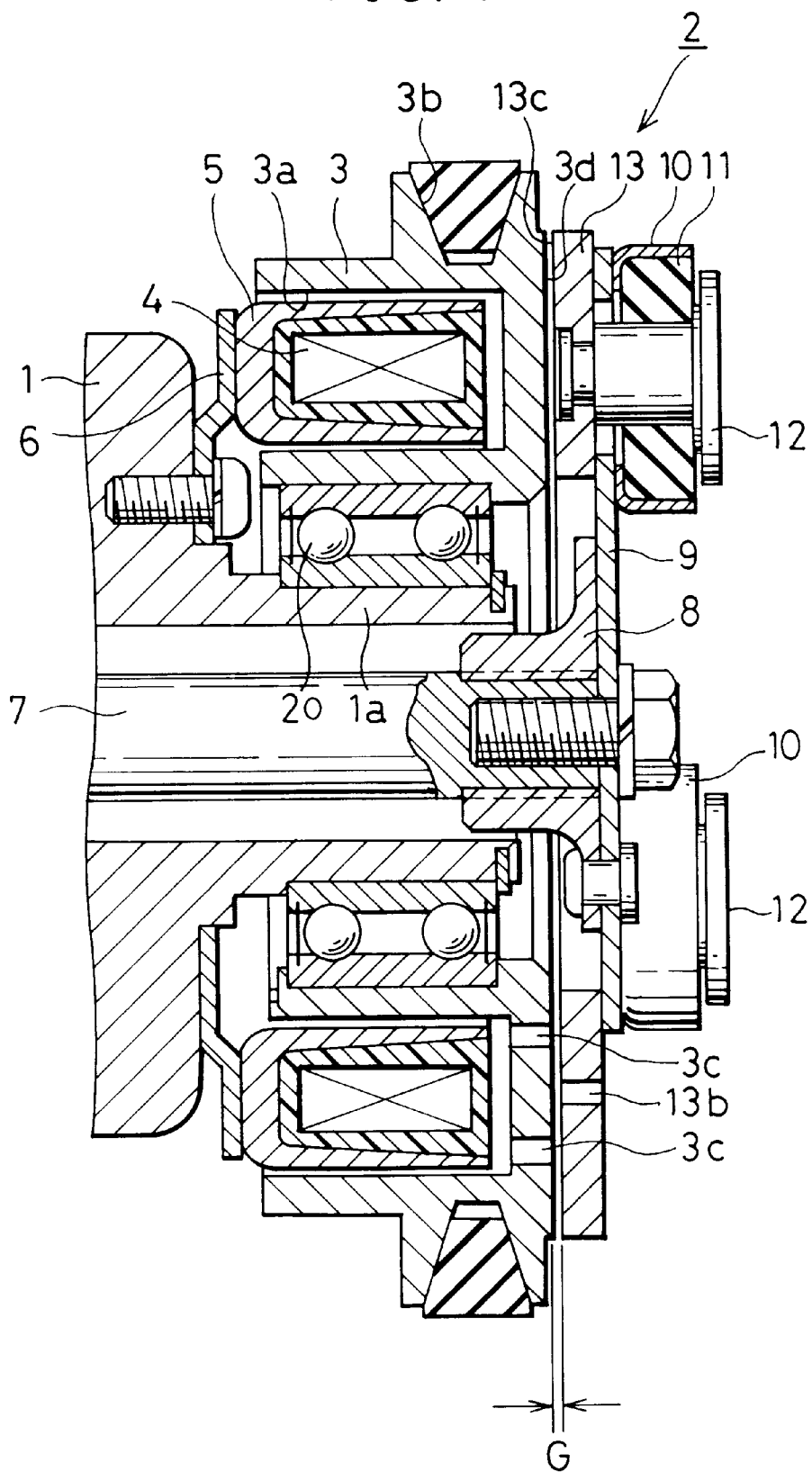
FIG. 1 is a cross-sectional view of a first embodiment of the present invention illustrating a solenoid clutch installed to a compressor.

Turning to the drawings, a solenoid clutch 2 is fitted to the compressor 1 of a car air conditioner that includes a rotor 3. The rotor is rotatably supported by a cylindrical portion 1a formed in the housing of the compressor 1 through a bearing 20. The rotor 3 has an annular groove 3a opening to the compressor 1 side, a pulley 3b on which a belt is hooked, and an arcuate elongated hole 3c for forming a gap in the magnetic flux path. A field core 5 having a built-in solenoid coil 4 is fitted into the annular groove 3a. A fitting plate 6 fused to the back of the field core 5 is fixed to the housing of the compressor 1 by a screw.

An armature hub 8 is spline-fitted to a rotary shaft 7 of the compressor 1. A stopper plate 9 comprising a thin sheet having a substantially regular triangular shape when viewed from the front is fixed by a rivet to an annular flange portion of the armature hub 8. Apertures or through-holes 9a are formed at positions dividing the corner portion of the stopper plate 9 into three equal parts in the circumferential direction. A damper cover 10 as a damper accommodation portion having through-holes 10a at the bottom portion 10b and concentrically with the through-holes 9a is fused to the outside surface of the stopper plate 9. The stopper plate 9 is fixed by a screw to the rotary shaft 7 on the end face of the rotary shaft 7 through an adjustment skim for an air gap G.

Each damper cover 10 comprises a cylindrical cup member and includes a damper rubber portion 11 shaped into a cylindrical shape. An apertures 11a communicating with the apertures 9a and 10a are formed in the damper rubber portion 11, and the inside surface on the outer peripheral edge side is in contact with the bottom portion 10b of the damper cover 10. The inside and outside surfaces of this damper rubber 11 are of a planar shape and the outer peripheral surface is fitted into the damper cover 10 to such an extent that the through-hole 11a at the center does not shrink. A torque transmission pin 12 is fitted into the through-hole 11a of each damper rubber 11.

Figure 2:
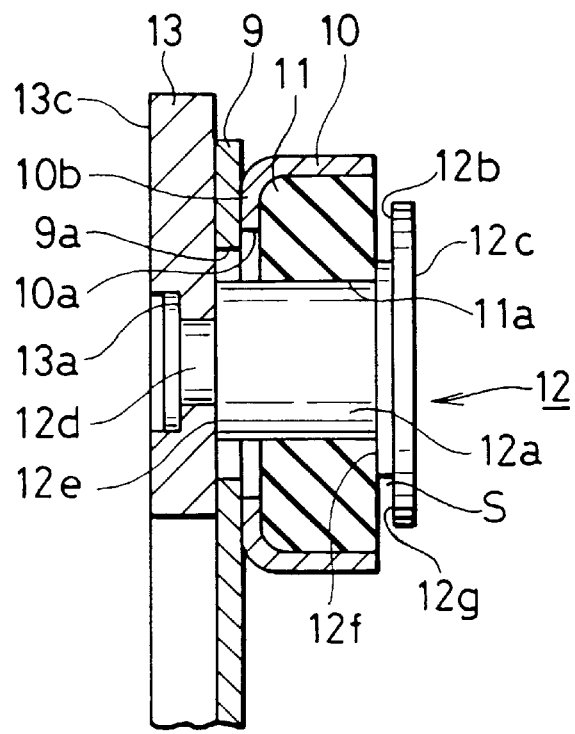
FIG. 2 is a cross-sectional view showing an enlargement of portions of FIG. 1.
Figure 3:
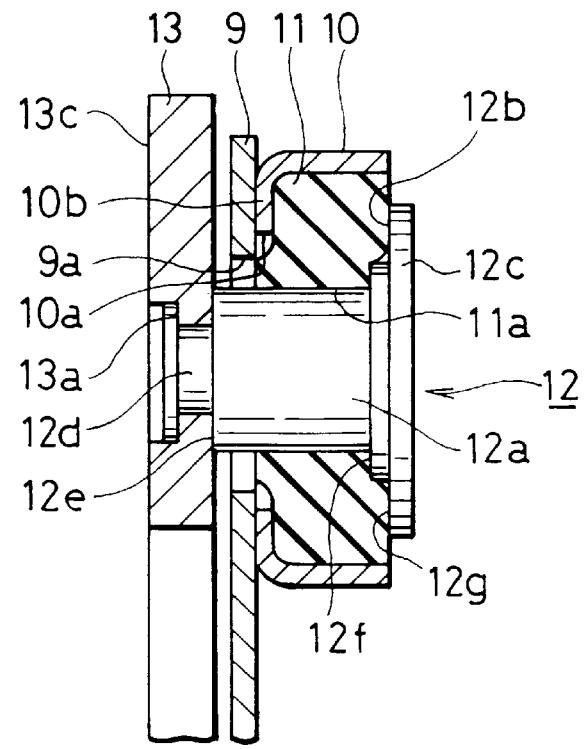
FIG. 3 is a cross-sectional view showing a compressed state of the damper rubber portion shown in FIG. 2.

As shown in FIGS. 2 and 3, the torque transmission pin 12 includes a drum portion 12a fitted from the through-hole 11a of the damper rubber 11 into the through-holes 9a and 10a of the stopper plate 9 and the damper cover 10. A head portion 12c has an inside surface which faces the outside surface of the damper rubber 11. The head portion is shaped into a stepped inside surface 12b. A leg portion 12d is fitted into a stepped through-hole 13a of the armature 13 and plastically coupled by caulking.

The armature 13 to which the leg portion 12d of the torque transmission pin 12 is fixed is a discoidal member having the through-holes 13a formed at positions dividing the circumference into three equal parts and includes the arcuate elongated hole 13b for detouring the magnetic flux. Its friction surface 13c opposes the friction surface 3d of the rotor 3 across the air gap G. When the leg portion 12d of the torque transmission pin 12 is caulked inside the aperture 13a, the side of the armature 13 opposite to the friction surface is brought into contact with the inside surface of the stopper plate 9 and the end face 12e of the drum portion 12a of the torque transmission pin 12.

Further, an upper stage portion 12f near the center, which is formed on the inside surface 12b of the torque transmission pin 12, is brought into contact with the outside surface near the center of the damper rubber 11. The lower stage portion 12g near the outer periphery, which is formed on the inside surface 12b, opposes the outside surface of the damper rubber 11 near the outer periphery through a space S. The size of this space S is set to a value which is smaller than, but approximate to, the size of the air gap G. When the air gap G is 0.6 mm, for example, the space S is about 0.5 mm. In the state shown in FIGS. 1 and 2, an initial spring load is imparted to the damper rubber 11 for holding the armature 13 stationary, and the center side of the damper rubber 11 is pushed towards the armature 13, though only slightly.

In the solenoid clutch 2 having such a construction, the rotor 3 connected to a crank pulley on the engine side by the belt rotates at a high speed. When the current is supplied to the solenoid coil 4 under this state, the magnetic flux flows through a double flux type magnetic circuit. The magnetic flux flows from the rotor 3 to the armature 13, and the friction surface 13c of the armature 13 is magnetically attracted to the friction surface 3d of the rotor 3 against the spring load of the damper rubber 11. In such an attraction process of the armature 13, the damper rubber 11 is compressed by the upper stage portion 12f of the torque transmission pin 12 and is then compressed further by the inside surface 12b of the torque transmission pin 12. Therefore, the spring constant of the damper rubber 11 when the armature is magnetically attracted to the rotor 3 becomes great. As a result, the impact between the armature 13 and the rotor 3 is mitigated and the occurrence of the armature attraction sound can be minimized.

When the armature 13 is magnetically attracted to the rotor 3, the revolution of the rotor 3 is transmitted to the rotary shaft 7 of the compressor 1 and consequently, the compressor 1 is driven. When the supply of the current to the solenoid coil 4 is cut off under this state, the magnetic flux disappears, so that the armature 13 is separated from the rotor 3 by the damper rubber 11 and the compressor 1 stops.

Figure 4:
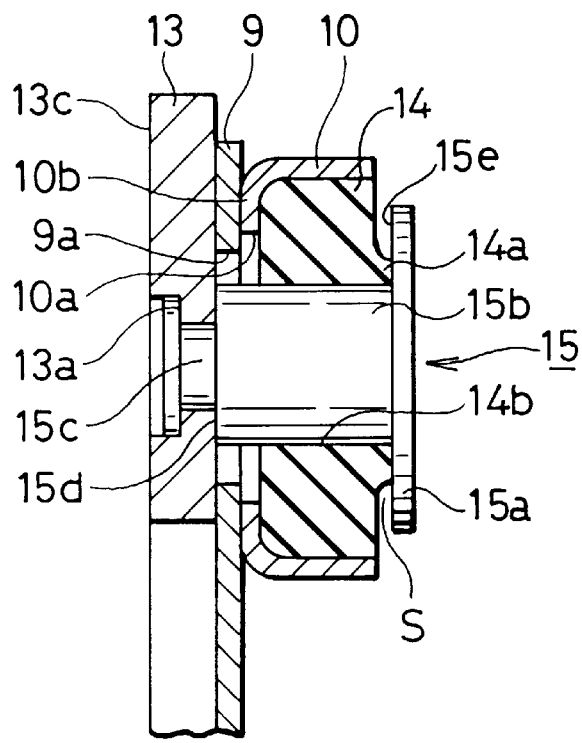
FIG. 4 is a cross-sectional view of another embodiment of the present invention.

Next, another embodiment of the present invention will be explained. FIG. 4 is an enlarged sectional view showing only the principal portions in the same way as in FIG. 2, and repetition of the explanation of those members of the solenoid clutch 2 which are explained already will be omitted by using the same reference numerals. As shown in the drawing, the solenoid clutch of this embodiment includes an annular protruding portion 14a formed on the outside surface of the damper rubber portion 14 accommodated in the damper cover 10. The torque transmission pin 15 fitted into the through-hole 14b of this damper rubber 14 includes a discoidal head portion 15a, a cylindrical drum portion 15b and a leg portion 15c caulked inside the aperture 13a of the armature 13 that are formed integrally with one another.

When the leg portion 15c of the torque transmission pin 15 is caulked, the side of the armature 13 opposite to the friction surface is brought into contact with the inside surface of the stopper plate 9 and at the same time, the end face 15d of the drum portion 15b of the torque transmission pin 15 is brought into contact with the surface of the armature 13 opposite to the friction surface. The protruding portion 14a of the damper rubber 14 is slightly pushed towards the armature 13 by the inside surface 15e of the head portion 15a of the damper rubber portion 14. Further, the inside surface 15e of the head portion 15a of the torque transmission pin 15 is close to the outer periphery and the outside surface of the damper rubber portion 14. The inside surface is also close to the outer peripheral edge and defines a space S having substantially the same size as the space represented by reference symbol S in FIG. 2.

Therefore, the spring constant of the damper rubber portion 14 can be increased in the attraction process of the armature 13 by shaping the outside surface of the damper rubber 14 into a non-planar outside surface. The surface is high at the portion close to the center and is low at the portion close to the outer periphery. Therefore, the solenoid clutch including such a damper rubber 14 and a torque transmission pin 15 can provide the action and effect equivalent to the action and effect of the solenoid clutch 2 already explained.

Figure 5:
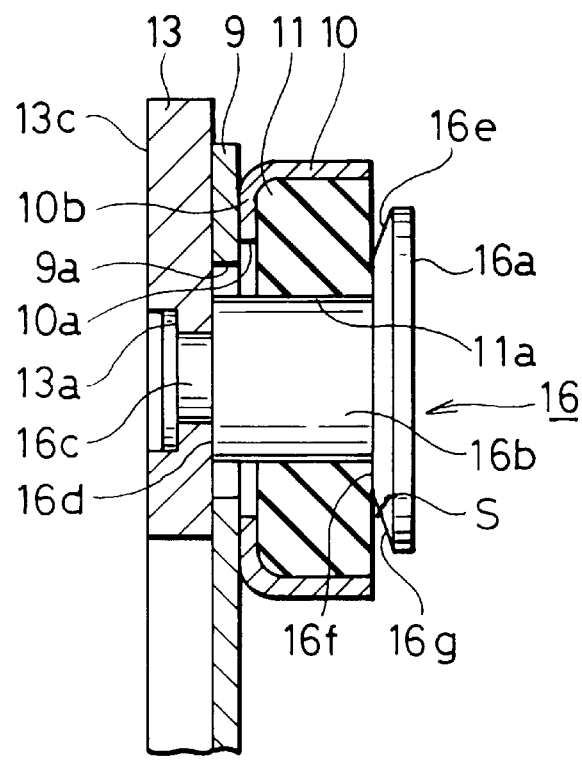
FIG. 5 is a cross-sectional view of still another embodiment of the present invention.

Next, another embodiment of the present invention will be explained. FIG. 5 is a sectional view showing in enlargement only the principal portions in the same way as in FIG. 2, and repetition of the explanation of those members of the solenoid clutch 2 which have been previously explained will be omitted by using the same reference numerals. As shown in FIG. 5, the torque transmission pin 16 of this embodiment includes the head portion 16a having the inside surface 16e opposite the outside surface of the damper rubber 11. The cylindrical drum portion 16b is fitted into the aperture 11a of the damper rubber 11 and the leg portion 16c is caulked inside the through-hole 13a of the armature 13. The end face 16d of the leg portion 16b is in contact with the surface of the armature 13 opposite to the friction surface.

The upper stage portion 16f in contact with the outside surface of the damper rubber 11 close to its center. A slope surface 16g is inclined from the upper stage portion towards the outer periphery and formed on the inside surface 16e of the torque transmission pin 16. The contact area between the inside surface 16e of the head portion 16a of the torque transmission pin 16 and the outside surface of the damper rubber 11 gradually increases in the attraction process of the armature 13. The maximum size of the space S is substantially equal to the space S shown in FIG. 2.

Though the solenoid clutch equipped with such a torque transmission pin 16 is different from the aforementioned solenoid clutches 2 in the spring load characteristics of the damper rubber 11, it provides the same action and effect in that the impact of the armature 13 and the rotor 3 is mitigated and the occurrence of the armature attraction sound is prevented.

Incidentally, in the embodiments explained above, the stopper plate 9 is integrally fixed to the flange portion of the armature hub 8 but a construction in which the damper cover 10 is directly welded to the flange portion of the armature hub 8 may be employed in place of the construction using such separate members. It is known to integrally mold the armature hub 8, the stopper plate 9 and the damper cover 10 from a synthetic resin or an aluminum alloy, and the design of the solenoid clutch according to the present invention can be changed in such a manner. Further, the torque transmission pin 12 may be produced from a non-magnetic metal or a synthetic resin. In addition, the spring load characteristics of the damper rubbers 11 and 14 in the attraction process of the armature 13 can be changed by changing the shapes of the damper rubbers 11 and 14 and the shapes of the head portions of the torque transmission pin 12, 15 and 16 to various shapes.

The solenoid clutch according to the present invention increases the spring constant of the damper rubber by increasing the contact area of the outside surface of the damper rubber with the inside surface of the head portion of the torque transmission pin in the attraction process of the armature. Therefore, the solenoid clutch can mitigate the impact when the armature is magnetically attracted to the rotor and can prevent the occurrence of the armature attraction sound. Further, because the spring constant is increased at the instant of the magnetic attraction of the armature to the rotor, the practical problem such as the extension of the armature attraction time does not occur.

Further, the present invention can be practiced easily by merely changing the shape of the inside surface of the head portion of the torque transmission pin and the shape of the outside surface of the damper rubber. Therefore, the present invention can economically provide a solenoid clutch capable of preventing the occurrence of the armature attraction sound.

What is claimed:

1. An electromagnetic coupling device comprising:
    a rotor supported for rotation under the influence of a source of power and having a friction surface;
    an armature having a friction surface spaced from said rotor friction surface by an air gap, said armature including a plurality of apertures extending therethrough;
    a field core assembly providing an electromagnetic force, said field core assembly mounted relative to said rotor such that actuation of the electromagnetic force causes said armature to be attracted to said rotor and such that said armature friction surface bridges said air gap to come into abutting contact with said rotor friction surface so that said rotor and said armature substantially rotate together; and
    a plurality of damper assemblies mounted to said armature, each of said damper assemblies including a damper accommodation portion having an aperture corresponding to one of said apertures extending through said armature and a damper member supported by said damper accommodation portion, said damper member having an outside surface disposed opposite said aperture through said damper accommodation portion and an aperture extending through said damper member and corresponding to one of said apertures extending through said damper accommodating portion and said armature;
    each of said plurality of damper assemblies including a torque transmission pin having a head portion formed at one end thereof, a leg portion formed at an opposed end thereof, and a drum portion extending therebetween, said leg portion being received in a corresponding one of said plurality of apertures in said armature so as to interconnect said damper assembly to said armature, said drum portion being received in said aperture in said damper member;
    each of said head portions including a stepped inside surface facing said outside surface of said damper member, said stepped inside surface including an upper stage portion disposed in pre-tensioned abutting contact with said outside surface of said damper member and a lower stage portion spaced from said outside surface of said damper member by a predetermined distance which, prior to actuation of said electromagnetic force, is less than said air gap between said rotor friction surface and said armature friction surface such that said electromagnetic force causes said armature to be attracted to said rotor and said damper member to absorb energy at a variable spring rate as contact between said outside surface of said damper member and said stepped inside surface of said head portion increases from said upper stage portion to said lower stage portion and across said predetermined distance.

2. An electromagnetic coupling device as set forth in claim 1 wherein said lower stage portion of said inside surface of said head portion defines a non-planar inclined surface extending radially outward from said upper stage portion at a predetermined slope.

3. An electromagnetic coupling device as set forth in claim 1 wherein said predetermined distance is about 0.1 mm less than said air gap.

4. An electromagnetic coupling device comprising:
    a rotor supported for rotation under the influence of a source of power and having a friction surface;
    an armature having a friction surface spaced from said rotor friction surface by an air gap, said armature including a plurality of apertures extending therethrough;
    a field core assembly providing an electromagnetic force, said field core assembly mounted relative to said rotor such that actuation of the electromagnetic force causes said armature to be attracted to said rotor and such that said armature friction surface bridges said air gap to come into abutting contact with said rotor friction surface so that said rotor and said armature substantially rotate together; and
    a plurality of damper assemblies mounted to said armature, each of said damper assemblies including a damper accommodation portion having an aperture corresponding to one of said apertures extending through said armature and a damper member supported by said damper accommodation portion, said damper member having a stepped outside surface disposed opposite said aperture through said damper accommodation portion and an aperture extending through said damper member and corresponding to one of said apertures extending through said damper accommodating portion and said armature;
    each of said plurality of damper assemblies further includes a torque transmission pin having a head portion formed at one end thereof, a leg portion formed at an opposed end thereof, and a drum portion extending therebetween, said leg portion being received in a corresponding one of said plurality of apertures in said armature so as to interconnect said damper assembly to said armature, said drum portion being received in said aperture in said damper member;
    said stepped outside surface of each of said damper members including an upper stage portion disposed in pretensioned abutting contact with said head portion of said torque transmission pin and a lower stage portion spaced from said head portion of said torque transmission pin by a predetermined distance which, prior to actuation of said electromagnetic force, is less than said air gap between said rotor friction surface and said armature friction surface such that said electromagnetic force causes said armature to be attracted to said rotor and said damper member to absorb energy at a variable spring rate as contact between said head portion of said torque transmission pin and said stepped outside surface of said damper member increases from said upper stage portion to said lower stage portion and across said predetermined distance.

5. An electromagnetic device as set forth in claim 4 wherein said predetermined distance is about 0.1 mm less than said air gap.

* * * * *